(12) United States Patent
Zhang et al.

(10) Patent No.: US 12,503,990 B2
(45) Date of Patent: Dec. 23, 2025

(54) EXHAUST GAS RECIRCULATION SYSTEM, ENGINE ASSEMBLY, AND VEHICLE

(71) Applicant: BYD COMPANY LIMITED, Guangdong (CN)

(72) Inventors: Nan Zhang, Shenzhen (CN); Qiang Wang, Shenzhen (CN); Junli Zheng, Shenzhen (CN); Zhiqin Xu, Shenzhen (CN); Yajun Ge, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 0 days.

(21) Appl. No.: 18/895,344

(22) Filed: Sep. 24, 2024

(65) Prior Publication Data
US 2025/0012242 A1 Jan. 9, 2025

Related U.S. Application Data

(63) Continuation of application No. PCT/CN2023/078769, filed on Feb. 28, 2023.

(30) Foreign Application Priority Data

Apr. 26, 2022 (CN) .......................... 202210445423.9

(51) Int. Cl.
*F02M 26/21* (2016.01)
*F02M 26/23* (2016.01)
(Continued)

(52) U.S. Cl.
CPC ............ *F02M 26/21* (2016.02); *F02M 26/23* (2016.02); *F02M 26/35* (2016.02); *F02M 35/10222* (2013.01)

(58) Field of Classification Search
CPC .... F02M 26/21; F02M 26/2623; F02M 26/35; F02M 26/06; F02M 26/17; F02M 26/04;
(Continued)

(56) References Cited

U.S. PATENT DOCUMENTS 4,960,096 A 10/1990 Sukimoto et al.
10,337,470 B2 * 7/2019 Penzato ................. F02M 26/70
(Continued)

FOREIGN PATENT DOCUMENTS

CN 102639837 A 8/2012
CN 105849401 A 8/2016
(Continued)

OTHER PUBLICATIONS

Universal Technical Institute (Jan. 6, 2021), What Is a Catalytic Converter and What Does It Do? https://www.uti.edu/blog/automotive/catalytic-converter, (Year: 2021).*

(Continued)

*Primary Examiner* — Grant Moubry
(74) *Attorney, Agent, or Firm* — Sheppard Mullin Richter & Hampton LLP

(57) ABSTRACT

An engine assembly includes an air inlet pipe having an air inlet, an air supply port, and an air return port. The air inlet communicates with air. The air supply port communicates with an air inlet manifold of an engine. In a length direction of the air inlet pipe, the air return port is located between the air inlet and the air supply port. An air inlet control valve is disposed on the air inlet pipe, and located between the air inlet and the air return port. An exhaust gas return pipe communicates with the air return port. An exhaust pipe communicates with the exhaust gas return pipe and an exhaust manifold of the engine. In the length direction of the air inlet pipe, a distance S between the air return port and the air inlet control valve and an inner diameter D of the air inlet pipe meet $S/D \leq 2$.

19 Claims, 6 Drawing Sheets

(51) Int. Cl.
*F02M 26/35* (2016.01)
*F02M 35/10* (2006.01)

(58) Field of Classification Search
CPC .............. F02M 35/10222; F02M 31/20; F02D 41/0025; F02D 41/0047; F02B 47/08
See application file for complete search history.

(56) References Cited

U.S. PATENT DOCUMENTS

| | | | |
|---|---|---|---|
| 10,697,362 B2 * | 6/2020 | Smiljanovski | ... F02M 35/10262 |
| 2011/0174279 A1 | 7/2011 | Ito | |
| 2012/0266594 A1 * | 10/2012 | Christmann | ............ F02B 39/16 |
| | | | 60/605.2 |
| 2014/0150759 A1 | 6/2014 | Song et al. | |
| 2020/0370518 A1 * | 11/2020 | Hirata | ..................... F02B 37/16 |

FOREIGN PATENT DOCUMENTS

| | | | | |
|---|---|---|---|---|
| CN | 208010484 U | | 10/2018 | |
| CN | 109798205 A | | 5/2019 | |
| CN | 108730014 B | * | 3/2020 | .............. F02B 23/00 |
| JP | H09151809 A | | 6/1997 | |
| JP | H10213019 A | | 8/1998 | |
| JP | H10325367 A | | 12/1998 | |
| WO | 2012101944 A1 | | 8/2012 | |

OTHER PUBLICATIONS

International Search Report and Written Opinion for Application No. PCT/CN2023/078769, mailed on Jun. 13, 2023, 9 pages.

* cited by examiner

EXHAUST GAS RECIRCULATION SYSTEM, ENGINE ASSEMBLY, AND VEHICLE

CROSS-REFERENCE TO RELATED APPLICATIONS

This application is a continuation application of International Patent Application No. PCT/CN2023/078769, filed on Feb. 28, 2023, which is based on and claims priority to and benefits of Chinese Patent Application No. 202210445423.9 filed on Apr. 26, 2022. The entire content of all of the above-referenced applications is incorporated herein by reference.

FIELD

The present disclosure relates to the technical field of vehicles, and more particularly, to an exhaust gas recirculation (EGR) system, an engine assembly, and a vehicle.

BACKGROUND

An exhaust gas recirculation (EGR) system usually increases an EGR rate by increasing a pressure difference between an exhaust gas return pipe and an air return port.

In the related art, an air inlet control valve is mounted between an air inlet and an air return port. Under a throttling effect generated by the air inlet control valve, negative pressure is formed at the air return port, thereby improving the EGR rate. However, since the position of the air inlet control valve is improper, a relatively large pumping loss is generated, and the EGR rate is relatively low.

SUMMARY

The present disclosure is to resolve at least one of technical problems in the related art. Therefore, the present disclosure is to provide an exhaust gas recirculation (EGR) system.

The present disclosure further provides an engine assembly having the above EGR system.

The present disclosure further provides a vehicle having the above engine assembly.

An embodiment of a first aspect of the present disclosure provides an EGR system. The EGR system includes an air inlet pipe having an air inlet, an air supply port, and an air return port. The air inlet communicates with air. The air supply port communicates with an air inlet manifold of an engine. In a length direction of the air inlet pipe, the air return port is located between the air inlet and the air supply port. An air inlet control valve is disposed on the air inlet pipe, and located between the air inlet and the air return port. An exhaust gas return pipe communicates with the air return port. An exhaust pipe communicates with the exhaust gas return pipe and an exhaust manifold of the engine. In the length direction of the air inlet pipe, a distance S between the air return port and the air inlet control valve and an inner diameter D of the air inlet pipe meet $S/D \leq 2$.

According to some embodiments of the present disclosure, the EGR system further includes a pressurizer. The pressurizer has a first end and a second end. The first end is disposed on the exhaust pipe. The first end is located between the engine and the exhaust gas return pipe. The second end is disposed on the air inlet pipe. The second end is located between the air return port and the air supply port. In the length direction of the air inlet pipe, the inner diameter D and a distance L between the air return port and the second end meet $2 \leq L/D \leq 20$.

According to some embodiments of the present disclosure, the EGR system further includes a pressurizer. The pressurizer has a first end and a second end. The first end is disposed d on the exhaust pipe. The first end is located between the engine and the exhaust gas return pipe. The second end is disposed on the air inlet pipe. The second end is located between the air return port and the air supply port. In the length direction of the air inlet pipe, the distance S and a distance L between the air return port and the second end meet $S<L$.

According to some embodiments of the present disclosure, the EGR system further includes a catalyst. The catalyst is disposed on the exhaust pipe. The catalyst is located between the exhaust gas return pipe and the first end.

According to some embodiments of the present disclosure, the catalyst is a ternary catalyst.

According to some embodiments of the present disclosure, in a direction from the air return port toward the exhaust pipe, the exhaust gas return pipe is gradually inclined toward the air inlet control valve.

According to some embodiments of the present disclosure, an included angle between the air inlet pipe and the exhaust gas return pipe ranges from 10° to 90°.

According to some embodiments of the present disclosure, the EGR system further includes an air return control valve and an EGR cooler. The air return control valve is disposed on the exhaust gas return pipe. The air return control valve is configured to control a gas flow rate in the exhaust gas return pipe. The EGR cooler is disposed on the exhaust gas return pipe. The EGR cooler is located between the air return control valve and the exhaust pipe. The EGR cooler is configured to cool a gas in the exhaust gas return pipe.

According to some embodiments of the present disclosure, an air filter is disposed on the air inlet pipe. The air filter is located between the air inlet and the air inlet control valve.

An embodiment of a second aspect of the present disclosure provides an engine assembly. The engine assembly includes the EGR system in the embodiment of the above first aspect and an engine. The engine has an air inlet manifold and an exhaust manifold. The air inlet manifold is in communication with the air inlet pipe of the EGR system. The exhaust manifold is in communication with the exhaust pipe of the EGR system.

According to some embodiments of the present disclosure, the engine assembly further includes an intercooler. The intercooler is arranged on the air inlet pipe. The intercooler is adjacent to the air inlet manifold of the engine.

According to some embodiments of the present disclosure, a quantity of runners of the air inlet manifold of the engine is the same as a quantity of cylinders of the engine.

According to some embodiments of the present disclosure, a quantity of runners of the exhaust manifold of the engine is the same as a quantity of cylinders of the engine.

An embodiment of a third aspect of the present disclosure provides a vehicle. The vehicle includes the engine assembly in the embodiment of the above second aspect.

A part of additional aspects and advantages of the present disclosure is provided in the following description. The part will become apparent from the following description, or is learned by practice of the present disclosure.

BRIEF DESCRIPTION OF THE DRAWINGS

The above and/or additional aspects and advantages of the present disclosure will become apparent and comprehensible from the following descriptions of embodiments made with reference to drawings.

DETAILED DESCRIPTION

Figure 1:
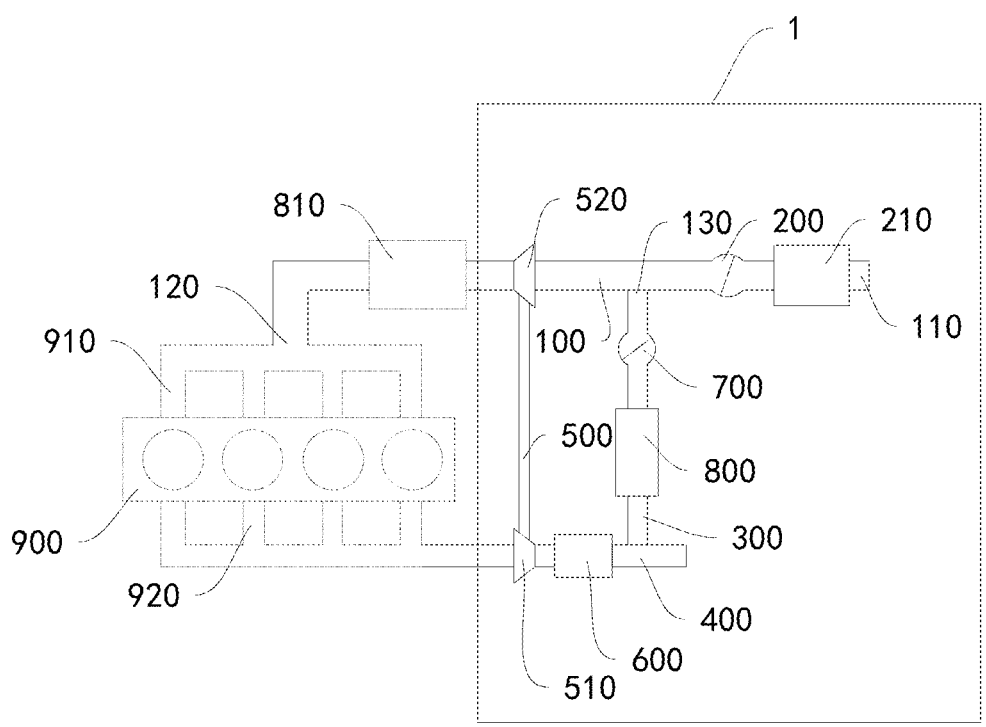
FIG. 1 is a schematic structural diagram of an exhaust gas recirculation (EGR) system according to an embodiment of the present disclosure.

Embodiments of the present disclosure are described below in detail, and the embodiments described with reference to drawings are examples.

In the description of the present disclosure, it should be understood that orientation or position relationships indicated by terms such as "center", "longitudinal", "transverse", "length", "width", "thickness", "upper", "lower", "front", "rear", "left", "right", "vertical", "horizontal", "top", "bottom", "inside", "outside", "clockwise", "anticlockwise", "axial direction", "radial direction", and "circumferential direction" are based on orientation or position relationships shown in the drawings, and are merely used for ease and brevity of description of the present disclosure, rather than indicating or implying that the mentioned device or element needs to have a particular orientation or be constructed and operated in a particular orientation. Therefore, the terms should not be construed as a limitation on the present disclosure.

In the description of the present disclosure, a "first feature" and a "second feature" may explicitly or implicitly include one or more features.

In the description of the present disclosure, "multiple" means two or more.

An exhaust gas recirculation (EGR) system 1 in the embodiments of the present disclosure is described below with reference to the drawings.

As shown in FIG. 1 to FIG. 4, the EGR system 1 in the embodiments of the present disclosure includes an air inlet pipe 100, an air inlet control valve 200, an exhaust gas return pipe 300, and an exhaust pipe 400.

The air inlet pipe 100 has an air inlet 110, an air supply port 120, and an air return port 130. The air inlet 110 is configured to be in communication with air. The air supply port 120 is configured to be in communication with an air inlet manifold 910 of an engine 900. In a length direction of the air inlet pipe 100, the air return port 130 is located between the air inlet 110 and the air supply port 120. The air inlet control valve 200 is arranged on the air inlet pipe 100. The air inlet control valve 200 is located between the air inlet 110 and the air return port 130. The exhaust gas return pipe 300 is in communication with the air return port 130. The exhaust pipe 400 is in communication with the exhaust gas return pipe 300. The exhaust pipe 400 is configured to be in communication with an exhaust manifold 920 of the engine 900. In the length direction of the air inlet pipe 100, a distance S exists between the air return port 130 and the air inlet control valve 200. The air inlet pipe 100 has an inner diameter D, where S/D≤2.

For example, an air filter 210 is arranged/disposed on the air inlet pipe 100. The air filter 210 is located between the air inlet 110 and the air inlet control valve 200.

It should be noted that, distance S may be a minimum distance between a center point of the air return port 130 and the air inlet control valve 200 in the length direction of the air inlet pipe 100.

According to the EGR system 1 in the embodiments of the present disclosure, the air inlet pipe 100 is provided with the air inlet 110, the air supply port 120, and the air return port 130, the air inlet 110 is configured to be in communication with the air, and the air supply port 120 is configured to be in communication the air inlet manifold 910 of the engine 900. In this way, fresh air can enter the air inlet pipe 100 through the air inlet 110 of the air inlet pipe 100, and be distributed to each cylinder of the engine 900 through the air supply port 120 and the air inlet manifold 910 of the engine 900, so that the engine 900 can operate normally.

In addition, in the length direction of the air inlet pipe 100, the air return port 130 is located between the air inlet 110 and the air supply port 120, the exhaust pipe 400 is configured to be in communication with the exhaust manifold 920 of the engine 900, and the exhaust gas return pipe 300 is in communication with the exhaust pipe 400 and the air return port 130. In this way, an exhaust gas generated by the engine 900 can enter the exhaust gas return pipe 300 through the exhaust pipe 400, and then enter the air inlet pipe 100 through the air return port 130, so that incompletely combusted air in the exhaust gas can re-enter the engine 900 through the air inlet pipe 100, thus achieving exhaust gas circulation and reuse.

Moreover, the air inlet control valve 200 is arranged on the air inlet pipe 100, and the air inlet control valve 200 is located between the air inlet 110 and the air return port 130. In this way, after the exhaust gas enters the air inlet pipe 100 through the air return port 130, the exhaust gas can directly flow toward the engine 900, that is, the air inlet control valve 200 does not prevent the exhaust gas from cyclically entering the engine 900, so that the exhaust gas and the fresh air can enter the engine 900 in mixture in the air inlet pipe 100. Therefore, a more reasonable structural configuration is achieved.

Figure 3:
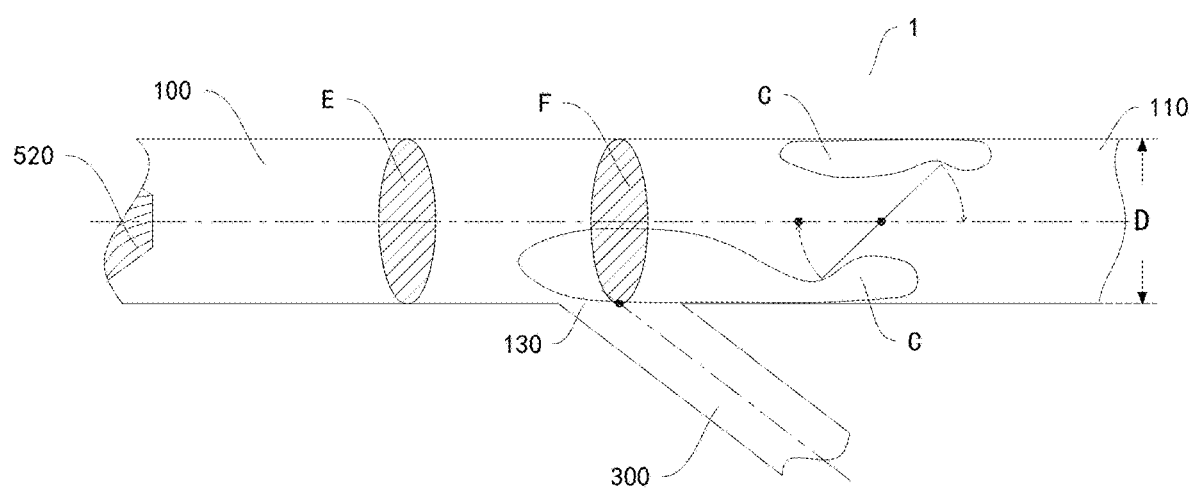
FIG. 3 is a schematic diagram of a high-temperature exhaust gas area in the air inlet pipe of the EGR system according to an embodiment of the present disclosure.

In addition, in the length direction of the air inlet pipe 100, the distance S exists between the air return port 130 and the air inlet control valve 200. The air inlet pipe 100 has the inner diameter D, where S/D≤2. A theoretical flow area on a side of the air inlet control valve 200 facing the air supply port 120 is defined as an area C below. As shown in FIG. 3, due to a throttling effect of the air inlet control valve 200, a flow section of a theoretical area of a pipeline on the side of the air inlet control valve 200 facing the air supply port 120 is reduced. The decrease in the flow section of the theoretical area results in an increase in an airflow velocity in the theoretical flow area. Since the airflow velocity in the above area C is greater than an airflow velocity in an area of the air inlet pipe 100 between the air supply port 120 and the air inlet control valve 200, a dynamic pressure in the area C is larger, and a static pressure in the area C is less than that in the area of the air inlet pipe 100 between the air supply port 120 and the air inlet control valve 200. Configuring the distance between the air return port 130 and the air inlet control valve 200 to be relatively small helps increase a pressure difference between the air return port 130 and the exhaust gas return pipe 300, thereby increasing an EGR rate, and reducing a pumping loss.

A pressure difference in the area C and a pressure difference in the area of the air inlet pipe 100 between the air supply port 120 and the air inlet control valve 200 are described with reference to FIG. 3 by using examples.

First, it is assumed that an area E and an area F exist in the air inlet pipe 100. The area F corresponds to a position of the air return port 130. The area E is located on a side of the air return port 130 away from the air inlet control valve 200.

A theoretical flow section of the area E is $E_1$. A theoretical flow section of the area F is $F_1$. In addition, a total pressure of the area F is $P_1$, and an airflow velocity is $v_1$. A dynamic pressure of the area F is $P_{dynamic\ 1}$, and a static pressure is $P_{static\ 1}$. $P_1 = P_{dynamic\ 1} + P_{static\ 1}$. A total pressure of the area E is $P_2$, and an airflow velocity is $v_2$. A dynamic pressure of the area E is $P_{dynamic\ 2}$, and a static pressure is $P_{static\ 2}$. $P_2 = P_{dynamic\ 2} + P_{static\ 2}$.

Since no throttling feature exists between the area E and the area F, no significant pressure loss or throttling effect is generated between the area E and the area F, and the total pressure of the area E is approximately equal to the total pressure of the area F, that is, $P_1 = P_2$.

Due to the throttling effect of the air inlet control valve 200, an airflow can merely move toward the air supply port 120 through the area C. Therefore, a theoretical flow section of an airflow on a side close to a mixing valve and facing the air supply port 120 is significantly reduced. The reduced section $F_1$ is significantly less than the section $E_1$. Since the reduction in the section results in an increase in an airflow velocity, a gas flow velocity at the section $F_1$ is relatively large. The airflow velocity at the section $F_1$ is greater than an airflow velocity at the section $E_1$.

According to a dynamic pressure calculation equation $P_{dynamic} = \rho v^2/2$, a dynamic pressure at the section $F_1$ is increased, and $P_{dynamic\ 2} < P_{dynamic\ 1}$.

In summary, $P_{static\ 1} < P_{static\ 2}$.

Therefore, the static pressure in the area C is relatively low, and a static pressure outside the area C is relatively high. Configuring S/D≤2 may increase the pressure difference between the air inlet 110 and the exhaust gas return pipe 300, increase an exhaust gas circulation amount, and reduce the pumping loss, to achieve a maximum EGR rate with a minimum pumping loss, thereby reducing a fuel consumption rate.

In this way, the EGR system 1 in the embodiments of the present disclosure has advantages such as a high EGR rate, a low pumping loss, and low oil consumption for the engine 900.

Figure 2:
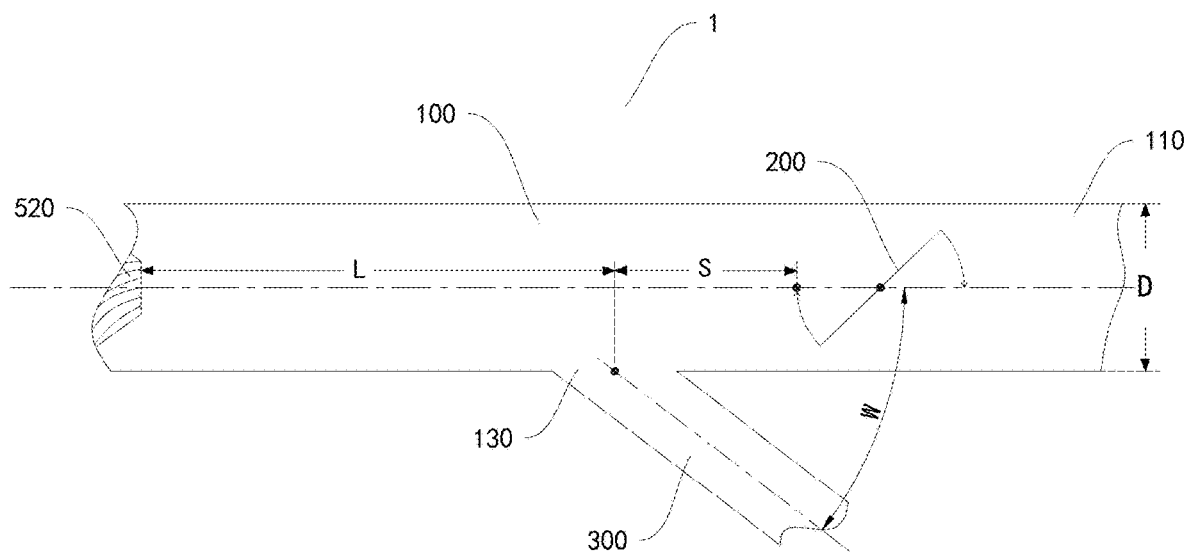
FIG. 2 is a schematic diagram of a theoretical flow section in an air inlet pipe of the EGR system according to an embodiment of the present disclosure.
Figure 4:
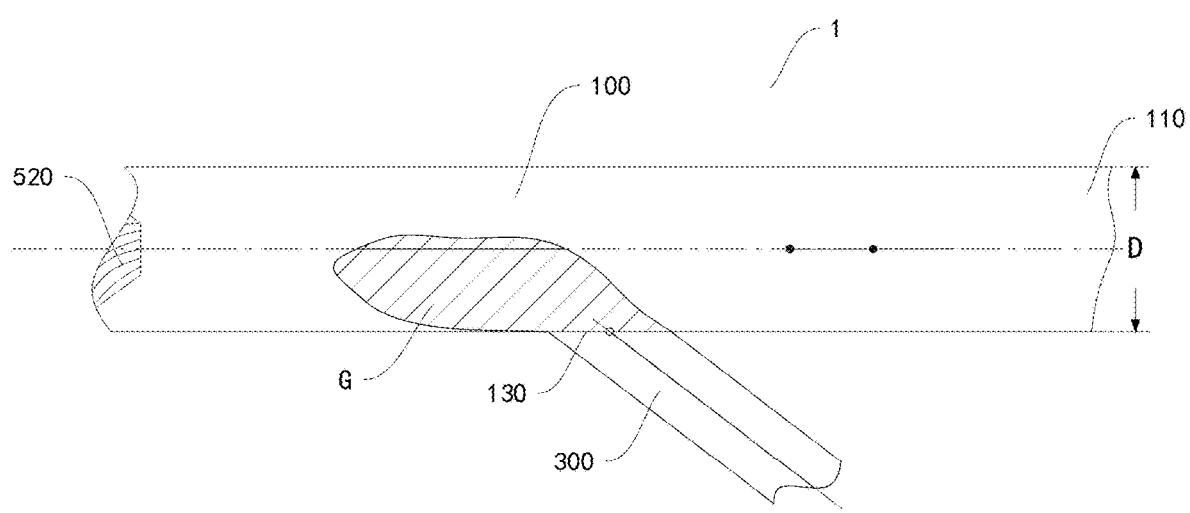
FIG. 4 is a schematic diagram of configuration of an engine assembly according to an embodiment of the present disclosure.

In some embodiments of the present disclosure, as shown in FIG. 2 and FIG. 4, the EGR system 1 further includes a pressurizer 500.

The pressurizer 500 has a first end 510 and a second end 520. The first end 510 is arranged/disposed on the exhaust pipe 400. The first end 510 is located between the engine 900 and the exhaust gas return pipe 300. The second end 520 is arranged on the air inlet pipe 100. The second end 520 is located between the air return port 130 and the air supply port 120. Specifically, when the engine 900 operates, the exhaust pipe 400 discharges an exhaust gas. The exhaust gas can drive the first end 510 of the pressurizer 500 to operate. The first end 510 transmits power to the second end 520. A rotation direction of the second end 520 of the pressurizer 500 is the same as a flowing direction of a gas in the air inlet pipe 100, to pressurize the gas in the air inlet pipe 100. In this way, the circulating exhaust gas and the fresh air can enter the engine 900 more quickly.

In the length direction of the air inlet pipe 100, a distance L exists between the air return port 130 and the second end 520, and 2≤L/D≤20. For example, L/D may be 2, 3, 4, 5, 6, 7, 8, 9, 10, 11, 12, 13, 14, 15, 16, 17, 18, 19, or 20. It should be noted that, distance L may be a distance between the center point of the air return port 130 and the second end 520 in the length direction of the air inlet pipe 100. For example, distance L is a minimum distance between the center point of the air return port 130 and the second end 520 in the length direction of the air inlet pipe 100.

It should be noted that, during the operation of the engine 900, a high-temperature recirculation exhaust gas enters the air inlet pipe 100 through the air return port 130. In the air inlet pipe 100, the high-temperature exhaust gas gets mixed with fresh air entering the air inlet pipe through the air inlet control valve 200. In an area (for example, an area G) near the air return port 130, the high-temperature exhaust gas has a relatively high temperature (which usually ranges from 120° C. to 150° C.), while the fresh air has a relatively low temperature.

Through configuring 2≤L/D, in the length direction of the air inlet pipe 100, the distance L between the air return port 130 and the second end 520 is relatively large, so that the high-temperature exhaust gas and the fresh air fully mix and then enter the second end 520 of the pressurizer 500. In this way, a risk of surge of the pressurizer 500 is reduced, pressurization efficiency of the pressurizer 500 is improved, and reliable operation of the pressurizer 500 is ensured. Moreover, through configuring L/D≤20, a throttling loss as a result of an excessively long airflow channel can be avoided, which further reduces the pumping loss of the engine 900. In this way, a relatively large EGR rate can be achieved with a relatively low pumping loss, thereby achieving low oil consumption in a full load mode.

In some embodiments of the present disclosure, as shown in FIG. 1 and FIG. 2, the EGR system 1 further includes a pressurizer 500. The pressurizer 500 has a first end 510 and a second end 520. The first end 510 is arranged on the exhaust pipe 400, and is located between the engine 900 and the exhaust gas return pipe 300. The second end 520 is arranged on the air inlet pipe 100, and is located between the air return port 130 and the air supply port 120. In the length direction of the air inlet pipe 100, a distance L exists between the air return port 130 and the second end 520, and S<L. Therefore, the distance S between the air return port 130 and the air inlet control valve 200 is smaller, and the distance L between the air return port 130 and the second end 520 is larger, which may increase the pressure difference between the air inlet 110 and the exhaust gas return pipe 300, increase the exhaust gas circulation amount, and reduce the pumping loss, to achieve a maximum EGR rate with a minimum pumping loss, thereby reducing the fuel consumption rate. In addition, the high-temperature exhaust gas and the fresh air can fully mix and then enter the second end 520 of the pressurizer 500. In this way, the risk of surge of the pressurizer 500 is reduced, the pressurization efficiency of the pressurizer 500 is improved, and the reliable operation of the pressurizer 500 is ensured.

In some embodiments of the present disclosure, as shown in FIG. 1 and FIG. 2, the EGR system 1 further includes a catalyst 600. The catalyst 600 is arranged on the exhaust pipe 400. The catalyst 600 is located between the exhaust gas return pipe 300 and the first end 510.

For example, the catalyst 600 may be a ternary catalyst. Through the configuration of the catalyst 600, an exhaust gas emitted by the engine 900 can be purified. For example, the catalyst 600 can convert CO, HC, or NOx in the exhaust gas into harmless carbon dioxide, water, and nitrogen, to reduce an amount of harmful gases discharged into the air, and can further purify the exhaust gas into a cleaner gas before the exhaust gas enters the air inlet pipe 100, which facilitates reuse of the exhaust gas from the engine 900, and reduces problems such as carbon deposition, coking, and gas path blockage in the engine 900.

In some embodiments of the present disclosure, as shown in FIG. 2 to FIG. 4, in a direction from the air return port 130 toward the exhaust pipe 400, that is, in a direction from an end of the exhaust gas return pipe 300 connected with the air return port 130 to an end of the exhaust gas return pipe 300 away from the air return port 130, the exhaust gas return pipe 300 is gradually inclined toward the air inlet control valve 200.

Therefore, an included angle between a flowing direction of a circulating exhaust gas in the exhaust gas return pipe 300 and a flowing direction of fresh air in the air inlet pipe 100 is relatively small, so that the exhaust gas can quickly enter the air inlet pipe 100, which ensures that the exhaust gas can enter the air inlet pipe 100 more smoothly, thereby further improving the EGR rate. Moreover, a flowing collision between the exhaust gas and the fresh air can be mitigated, and the exhaust gas can quickly get mixed with the fresh air after entering the air inlet pipe 100, and flow more smoothly, which further increases a flow rate of the mixed air, helps the mixed air enter the engine 900, improves the EGR rate, and reduces the pumping loss, thereby achieving low oil consumption in the full load mode.

Further, as shown in FIG. 2 to FIG. 4, an included angle W between the air inlet pipe 100 and the exhaust gas return pipe 300 ranges from 10° to 90°. For example, the included angle between the air inlet pipe 100 and the exhaust gas return pipe 300 may be 10°, 15°, 20°, 25°, 30°, 35°, 40°, 45°, 50°, 55°, 60°, 65°, 70°, 75°, 80°, 85°, or 90°. However, the included angle is not limited thereto.

It should be noted that, an included angle between a part of the air inlet pipe 100 connected with the exhaust gas return pipe 300 and the exhaust gas return pipe 300 ranges from 10° to 90° (including endpoint values).

In this way, an excessively low flow rate of the exhaust gas in the exhaust gas return pipe 300 in the air inlet pipe 100 as a result of an excessively small included angle between the air inlet pipe 100 and the exhaust gas return pipe 300 can be avoided, which enables the exhaust gas to quickly enter the air inlet pipe 100, and ensures smooth flowing of the exhaust gas. In addition, the flowing direction of the exhaust gas in the exhaust gas return pipe 300 can be prevented from being opposite to the flowing direction of the fresh air in the air inlet pipe 100 as a result of an excessively large included angle between the air inlet pipe 100 and the exhaust gas return pipe 300, which prevents the fresh air in the air inlet pipe 100 from colliding with the exhaust gas, and ensures an overall flow rate of the exhaust gas and the fresh air in the air inlet pipe 100. In this way, the pumping loss can be reduced, and a relatively high EGR rate can be ensured, thereby achieving low oil consumption in the full load mode.

Figure 5:
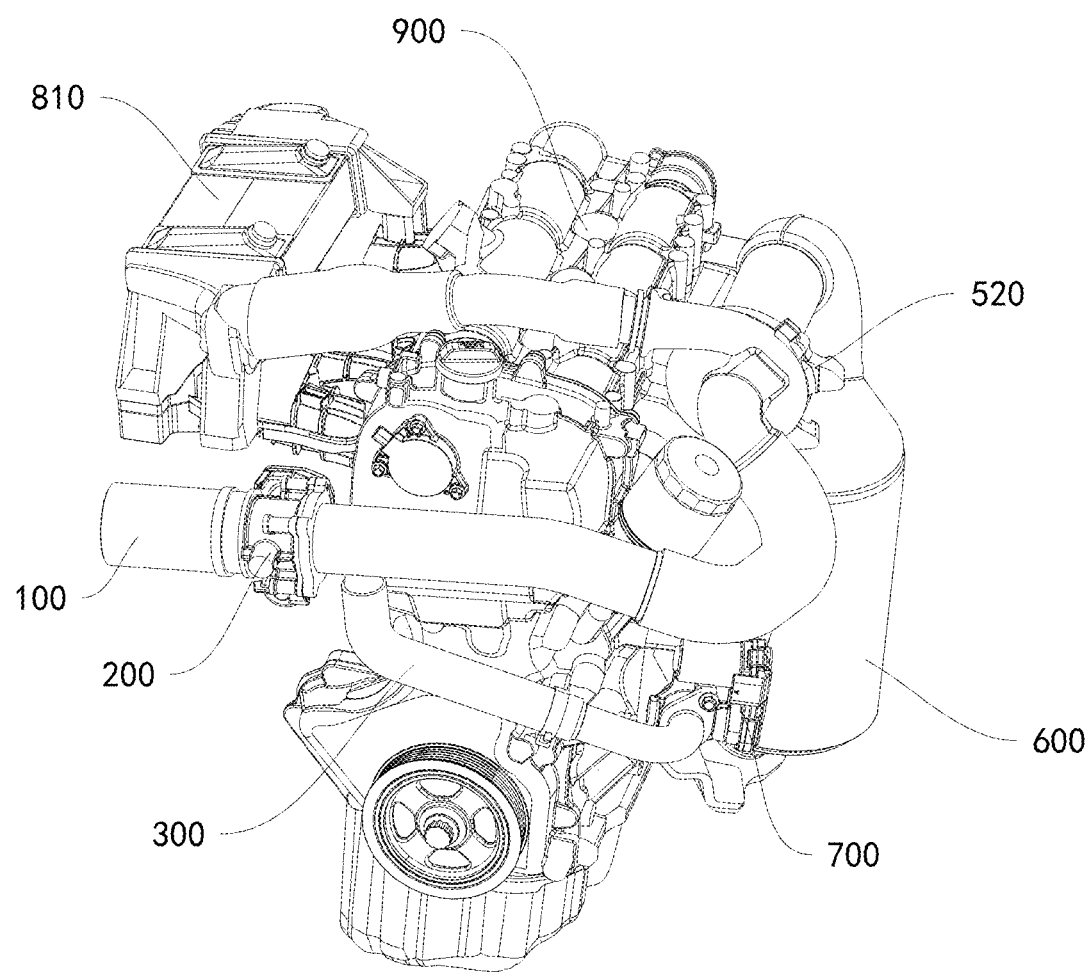
FIG. 5 is a schematic structural diagram of the engine assembly according to an embodiment of the present disclosure.

In some embodiments of the present disclosure, as shown in FIG. 1 and FIG. 5, the EGR system 1 further includes an air return control valve 700 and an EGR cooler 800.

The air return control valve 700 is arranged on the exhaust gas return pipe 300. The air return control valve 700 is configured to control a gas flow rate in the exhaust gas return pipe 300. Specifically, the air return control valve 700 can regulate a flow rate of the exhaust gas in the exhaust gas return pipe 300. The EGR cooler 800 is arranged on the exhaust gas return pipe 300. The EGR cooler 800 is located between the air return control valve 700 and the exhaust pipe 400. The EGR cooler 800 is configured to cool the gas in the exhaust gas return pipe 300.

For example, when the engine 900 does not operate, an initial state of the air return control valve 700 is closed, and an initial state of the air inlet control valve 200 is open. During operation of the engine 900, the engine 900 discharges an exhaust gas. In this case, the air return control valve 700 may be gradually opened, so that the exhaust gas returns to the engine 900 through the exhaust gas return pipe 300. When the engine 900 requires a high EGR rate, an opening degree of the air return control valve 700 may be increased, and the air inlet control valve 200 may be properly closed, to increase a rate of exhaust gases entering the air inlet pipe 100, thereby improving the EGR rate.

In addition, through the configuration of the EGR cooler 800, the high-temperature exhaust gas can be cooled in the exhaust gas return pipe 300, so that the exhaust gas has a relatively low temperature when entering the air inlet pipe 100. In this way, the mixed gas of the exhaust gas and the fresh air is prevented from an excessively high temperature, which further reduces the risk of surge of the pressurizer 500, increases the pressurization efficiency of the pressurizer 500, and ensures the reliable operation of the pressurizer 500. Moreover, the exhaust gas in the exhaust gas return pipe 300 needs to be cooled through the EGR cooler 800 before passing through the air return control valve 700, so that damage to the air return control valve 700 caused by the high-temperature gas can be avoided, thereby prolonging a service life of the air return control valve 700.

An engine assembly 2 in the embodiments of the present disclosure is described below with reference to FIG. 1 to FIG. 5.

As shown in FIG. 1 and FIG. 5, the engine assembly 2 includes the EGR system 1 in the above embodiments of the present disclosure and an engine 900. The engine 900 has an air inlet manifold 910 and an exhaust manifold 920. The air inlet manifold 910 is in communication with the air inlet pipe 100 of the EGR system 1. The exhaust manifold 920 is in communication with the exhaust pipe 400 of the EGR system 1.

A quantity of runners of the air inlet manifold 910 may be in one-to-one correspondence with a quantity of cylinders of the engine 900. A quantity of runners of the exhaust manifolds 920 may be in one-to-one correspondence with the quantity of cylinders of the engine 900. A gas in the air inlet pipe 100 may enter the cylinders of the engine 900 through the multiple runners of the air inlet manifolds 910 respectively, and exhaust gases generated after combustion in the cylinders may be discharged to the exhaust pipe 400 through the multiple runners of the air exhaust manifolds 920 respectively.

The engine assembly 2 in the embodiments of the present disclosure adopts the EGR system 1 in the above embodiments of the present disclosure, which has advantages such as a high EGR rate, a low pumping loss, and low oil consumption for the engine 900.

In some embodiments of the present disclosure, as shown in FIG. 1 and FIG. 5, the engine assembly 2 further includes an intercooler 810. The intercooler 810 is arranged on the air inlet pipe 100. The intercooler 810 is adjacent to the air inlet manifold 910 of the engine 900. In this way, the intercooler 810 can further reduce a temperature of a mixed gas of air and an exhaust gas entering the engine 900, to avoid an excessive high combustion temperature of the engine 900, thereby further reducing fuel consumption for the engine 900, reducing oil consumption, and improving an endurance.

Figure 6:
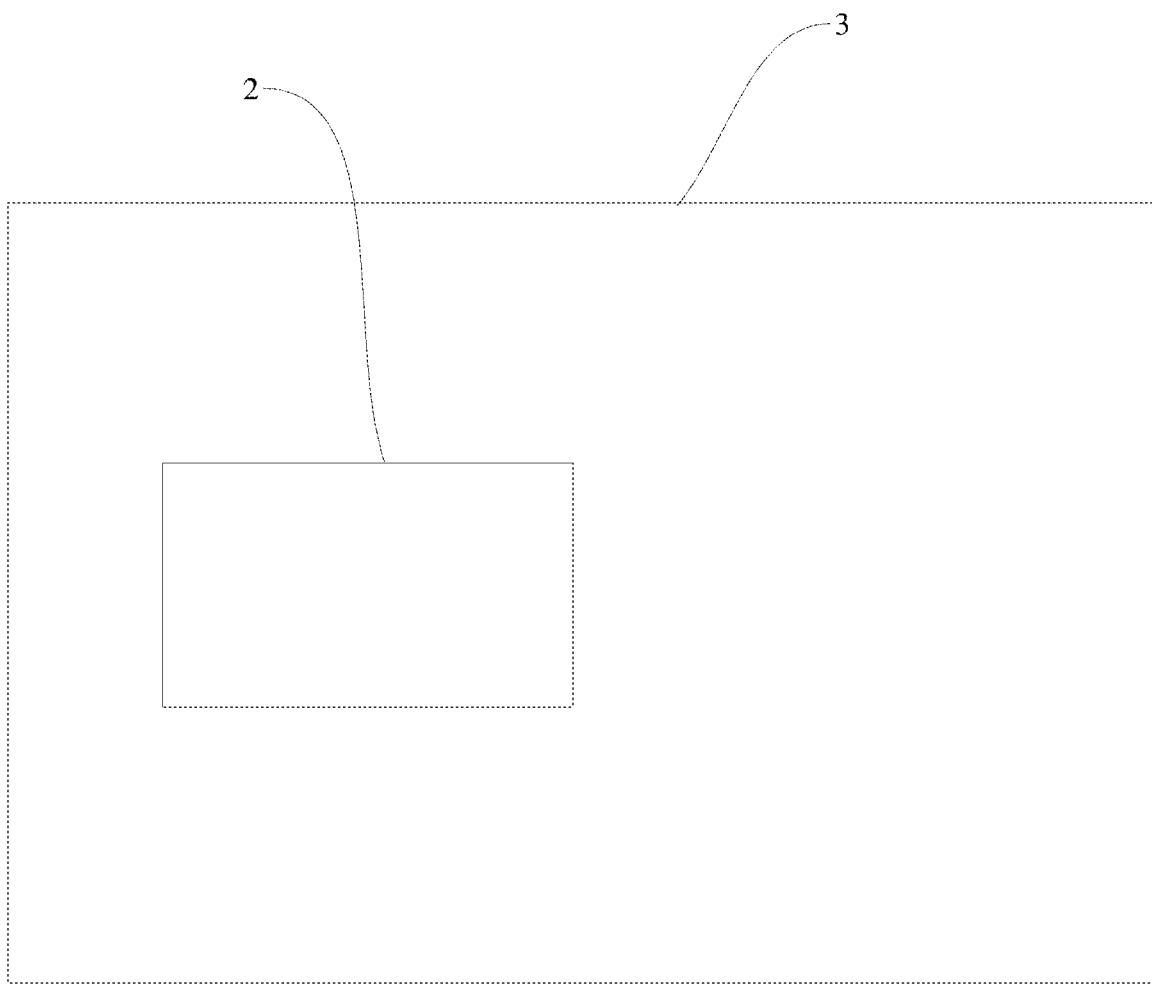
FIG. 6 is a schematic diagram of a vehicle according to an embodiment of the present disclosure.

A vehicle 3 in the embodiments of the present disclosure is described below with reference to FIG. 6. The vehicle 3 includes the engine assembly 2 in the above embodiments of the present disclosure.

The vehicle 3 in the embodiments of the present disclosure adopts the engine assembly 2 in the above embodiments of the present disclosure, which has advantages such as a high EGR rate, a low pumping loss, and low fuel consumption for the engine 900.

Other compositions and operations of the EGR system 1, the engine assembly 2, and the vehicle 3 in the embodiments of the present disclosure are known to a person of ordinary skill in the art, and therefore are not described in detail herein.

In the description of this specification, descriptions provided with reference to the terms such as "an embodiment", "some embodiments", "an exemplary embodiment", "an example", "a specific example", and "some examples" mean that features, structures, materials, or characteristics described with reference to the embodiment or example are included in at least one embodiment or example of the present disclosure. In this specification, examples of descriptions of the above terms do not necessarily refer to the same embodiment or example.

Although the embodiments of the present disclosure have been shown and described, a person of ordinary skill in the art should understand that various changes, modifications, replacements, and variations may be made to the embodiments without departing from the principle and spirit of the present disclosure. The scope of the present disclosure is defined by the appended claims and their equivalents.

What is claimed is:

1. An exhaust gas recirculation system, comprising:
an air inlet pipe having an air inlet, an air supply port, and an air return port, the air inlet configured to be in communication with air; the air supply port configured to be in communication with an air inlet manifold of an engine; and in a length direction of the air inlet pipe, the air return port located between the air inlet and the air supply port;
an air inlet control valve disposed on the air inlet pipe, and located between the air inlet and the air return port;
an air filter disposed on the air inlet pipe, and located between the air inlet and the air inlet control valve;
an exhaust gas return pipe being in communication with the air return port;
an exhaust pipe being in communication with the exhaust gas return pipe, and configured to be in communication with an exhaust manifold of the engine, wherein in the length direction of the air inlet pipe, a distance S between the air return port and the air inlet control valve and an inner diameter D of the air inlet pipe are configured to meet S/D≤2;
a pressurizer having a first end and a second end, wherein in the length direction of the air inlet pipe, the inner diameter D and a distance L between the air return port and the second end are configured to meet 2≤L/D≤20; and
a catalyst disposed on the exhaust pipe, wherein the catalyst is configured to convert CO, HC, or $NO_x$ in an exhaust gas into carbon dioxide, water, or nitrogen.

2. The system according to claim 1,
wherein: the first end is disposed on the exhaust pipe and located between the engine and the exhaust gas return pipe; and the second end is disposed on the air inlet pipe and located between the air return port and the air supply port.

3. The system according to claim 1,
wherein the first end is disposed on the exhaust pipe and located between the engine and the exhaust gas return pipe; and the second end is disposed on the air inlet pipe and located between the air return port and the air supply port, and
wherein in the length direction of the air inlet pipe, the distance S and the distance L between the air return port and the second end are configured to meet S<L.

4. The system according to claim 3, wherein the catalyst is located between the exhaust gas return pipe and the first end.

5. The system according to claim 4, wherein the catalyst comprises a ternary catalyst.

6. The system according to claim 1, wherein in a direction from the air return port toward the exhaust pipe, the exhaust gas return pipe is gradually inclined toward the air inlet control valve.

7. The system according to claim 6, wherein an included angle between the air inlet pipe and the exhaust gas return pipe ranges from 10° to 90°.

8. The system according to claim 1, further comprising:
an air return control valve disposed on the exhaust gas return pipe, and configured to control a gas flow rate in the exhaust gas return pipe; and
an exhaust gas recirculation cooler disposed on the exhaust gas return pipe, located between the air return control valve and the exhaust pipe, and configured to cool a gas in the exhaust gas return pipe.

9. An engine assembly, comprising:
an engine having an air inlet manifold and an exhaust manifold; and
an exhaust gas recirculation system, comprising:
an air inlet pipe having an air inlet, an air supply port, and an air return port, the air inlet configured to be in communication with air; the air supply port configured to be in communication with the air inlet manifold of the engine; and in a length direction of the air inlet pipe, the air return port located between the air inlet and the air supply port;
an air inlet control valve disposed on the air inlet pipe, and located between the air inlet and the air return port;
an air filter disposed on the air inlet pipe, and located between the air inlet and the air inlet control valve;
an exhaust gas return pipe being in communication with the air return port;
an exhaust pipe being in communication with the exhaust gas return pipe, and configured to be in communication with the exhaust manifold of the engine, wherein in the length direction of the air inlet pipe, a distance S between the air return port and the air inlet control valve and an inner diameter D of the air inlet pipe are configured to meet S/D≤2;
a pressurizer having a first end and a second end, wherein in the length direction of the air inlet pipe, the inner diameter D and a distance L between the air return port and the second end are configured to meet 2≤L/D≤20; and
a catalyst disposed on the exhaust pipe, wherein the catalyst is configured to convert CO, HC, or $NO_x$ in an exhaust gas into carbon dioxide, water, or nitrogen.

10. The engine assembly according to claim 9, further comprising:
an intercooler disposed on the air inlet pipe, and adjacent to the air inlet manifold.

11. The engine assembly according to claim 9, wherein a quantity of runners of the air inlet manifold of the engine is the same as a quantity of cylinders of the engine.

12. The engine assembly according to claim 9, wherein a quantity of runners of the exhaust manifold of the engine is the same as a quantity of cylinders of the engine.

13. The engine assembly according to claim 9, wherein:
the first end is disposed on the exhaust pipe and located between the engine and the exhaust gas return pipe; and
the second end is disposed on the air inlet pipe and located between the air return port and the air supply port.

14. The engine assembly according to claim 9, wherein:
the first end is disposed on the exhaust pipe and located between the engine and the exhaust gas return pipe; and
the second end is disposed on the air inlet pipe and located between the air return port and the air supply port, and
wherein in the length direction of the air inlet pipe, the distance S and the distance L between the air return port and the second end are configured to meet S<L.

15. The engine assembly according to claim 14, wherein the catalyst is located between the exhaust gas return pipe and the first end.

16. The engine assembly according to claim 15, wherein the catalyst comprises a ternary catalyst.

17. The engine assembly according to claim 9, wherein in a direction from the air return port toward the exhaust pipe, the exhaust gas return pipe is gradually inclined toward the air inlet control valve.

18. The engine assembly according to claim 17, wherein an included angle between the air inlet pipe and the exhaust gas return pipe ranges from 10° to 90°.

19. A vehicle, comprising an engine assembly comprising:
an engine having an air inlet manifold and an exhaust manifold; and
an exhaust gas recirculation system, comprising:
an air inlet pipe having an air inlet, an air supply port, and an air return port, the air inlet configured to be in communication with air; the air supply port configured to be in communication with the air inlet manifold of the engine; and in a length direction of the air inlet pipe, the air return port located between the air inlet and the air supply port;
an air inlet control valve disposed on the air inlet pipe, and located between the air inlet and the air return port;
an air filter disposed on the air inlet pipe, and located between the air inlet and the air inlet control valve;
an exhaust gas return pipe being in communication with the air return port; and
an exhaust pipe being in communication with the exhaust gas return pipe, and configured to be in communication with the exhaust manifold of the engine,
wherein in the length direction of the air inlet pipe, a distance S between the air return port and the air inlet control valve and an inner diameter D of the air inlet pipe are configured to meet $S/D \leq 2$;
a pressurizer having a first end and a second end, wherein in the length direction of the air inlet pipe, the inner diameter D and a distance L between the air return port and the second end are configured to meet $2 < L/D \leq 20$; and
a catalyst disposed on the exhaust pipe, wherein the catalyst is configured to convert CO, HC, or $NO_x$ in an exhaust gas into carbon dioxide, water, or nitrogen.

\* \* \* \* \*